US006438683B1

United States Patent
Endsley

(10) Patent No.: US 6,438,683 B1
(45) Date of Patent: Aug. 20, 2002

(54) TECHNIQUE USING FIFO MEMORY FOR BOOTING A PROGRAMMABLE MICROPROCESSOR FROM A HOST COMPUTER

(75) Inventor: Jay A. Endsley, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 07/922,116

(22) Filed: Jul. 28, 1992

(51) Int. Cl.$^7$ ............................................. G06F 9/445
(52) U.S. Cl. ............................... 713/1; 713/2; 713/100; 710/104
(58) Field of Search ........................... 364/700, 230.4, 364/280.2, 942.4

(56) References Cited

U.S. PATENT DOCUMENTS

| 4,407,016 | A |   | 9/1983  | Bayliss et al. ............... 364/200 |
| 4,975,904 | A |   | 12/1990 | Mann et al. ................ 370/85.1 |
| 4,975,905 | A |   | 12/1990 | Mann et al. ................ 370/85.1 |
| 5,136,713 | A | * | 8/1992  | Bealkowski et al. ......... 395/700 |
| 5,155,833 | A | * | 10/1992 | Cullison et al. ............. 395/425 |
| 5,210,875 | A | * | 5/1993  | Bealkowski et al. ......... 395/700 |

FOREIGN PATENT DOCUMENTS

| EP | 0268285 | 11/1986 |
| EP | 0262468 | 4/1988  |

OTHER PUBLICATIONS

Research Disclosure, vol. 326, No. 093, Jun. 10, 1991, Ensworth, GB, pp. 457–459, "Apparatus for Programming a Peripheral Processor".

IBM Technical Disclosure Bulletin, vol. 32, No. 9B, 2/90, New York, US, pp. 312–319, "Personal Computer System to Intel 80452–based Adapter Download Algorithm".

* cited by examiner

Primary Examiner—Majid Banankhah
(74) Attorney, Agent, or Firm—Nelson Adrian Blish

(57) ABSTRACT

A computer system, which includes a host computer and at least one programmable slave processor, boots the slave processor simply and inexpensively by using a first in first out (FIFO) memory connected between the host computer and the slave processor. Specifically, the computer system includes a host computer, a programmable microprocessor (the slave processor) controlled by the host computer, a FIFO memory connected between the host computer and the microprocessor, and means for providing a boot program and/or boot data from the host computer to the microprocessor through the FIFO memory. When the boot program functions, operating instructions for the microprocessor are read into the microprocessor's own random access memory (RAM).

24 Claims, 2 Drawing Sheets

TECHNIQUE USING FIFO MEMORY FOR BOOTING A PROGRAMMABLE MICROPROCESSOR FROM A HOST COMPUTER

FIELD OF THE INVENTION

This invention relates generally to computer systems and, more particularly, to computer systems making use of one or more supplemental programmable microprocessors, also referred to as slave processors.

BACKGROUND OF THE INVENTION

More often than not, the design of a stand-alone computer represents a substantial number of compromises, resulting in a machine which performs a very large number of different tasks well but which may not excel at a few highly specialized tasks. To enable such a computer to perform the specialized tasks more effectively or more rapidly, its own programmable central processing unit (CPU) is commonly supplemented by one or more additional processors (sometimes referred to as slave processors), each of which is itself a programmable microprocessor. Supplementing a host computer's CPU with a slave processor for the purpose of processing digital images is a good example.

When operational, a slave processor is typically controlled by instructions contained in its own random access memory (RAM), a hardware element which retains information only as long as power remains applied to it. Before such a slave processor can become operational, a process needs to occur which resets the slave processor and causes it to begin running a set of instructions (program) from RAM. Most processors begin executing start-up code from a specific pre-designated location during an initial process called booting or bootstrapping. For this reason, the start-up code is often referred to as a boot or bootstrapping program. The boot process typically begins after power is applied to the processor and its RAM (a cold boot) or after the processor has been reset to its initial state with power already on (a warm boot). Once it begins, the boot process uses the boot program to tell the processor how to read operating instructions from designated sources into its RAM. For the host computer's own central processing unit (CPU), a read only memory (ROM) chip is usually first looked to as the source of the boot program which is to be executed. In the past, a slave processor typically has either been provided with its own ROM for this purpose or has been provided with a dual ported RAM which permits the host computer to download the boot program to be executed by the slave processor directly into the slave processor's own RAM.

Some microprocessors have an on-chip ROM that contains a generic loader program which facilitates the booting process. This small loader program starts running from the on-chip ROM when the microprocessor is reset and contains program instructions which move the program to be executed on the microprocessor from externally connected ROM to externally connected RAM. The data width of the externally connected ROM may not be the same as the externally connected RAM, thus permitting a reduction in the number of ROM devices required in a system.

Both of these commonly employed arrangements for booting up a slave processor have significant disadvantages. Providing the slave processor with its own ROM for booting purposes creates major disadvantages if the boot program stored in the ROM ever has to be changed. The ROM itself then has to be replaced, which is not only inconvenient but also can be quite expensive if a large number of systems are involved. In addition, a slave processor sometimes needs to communicate with the host CPU on a two way basis, and a ROM provides no such capability. Additional communication circuitry is then required. As to the alternative approach, a dual ported RAM not only is relatively expensive to use for booting purposes but also, because of its relative bulk, frequently requires more space than may be readily available in desk-top equipment. Furthermore, most dual ported RAM implementations do not allow simultaneous access to the RAM by both attached devices, which can adversely affect the speed of communications between the host computer and the slave processor.

SUMMARY OF THE INVENTION

The present invention solves these problems of the prior art simply and inexpensively by using a first in first out (FIFO) memory connected between the host computer and the slave processor. Broadly, the invention takes the form of a computer system comprising a host computer, a programmable microprocessor (the slave processor) controlled by the host computer, a FIFO memory connected between the host computer and the microprocessor, and means for providing a boot program and/or boot data from the host computer to the microprocessor through the FIFO memory. The boot program used by the microprocessor is easy to change since it is not located in ROM, the components in the system are reduced by the number of ROM's that would otherwise be required, and the FIFO memory is usable as a means for communicating with the host computer after the booting up stage has completed.

More specifically, the invention takes the form of a computer system comprising a host computer having an input/output (I/O) memory bus, a programmable microprocessor controlled by the host computer and having at least one memory bus of its own, a FIFO memory connected between the I/O memory bus of the host computer and a memory bus of the microprocessor, and means for providing a boot program and/or boot data from the host computer to the microprocessor through the FIFO memory.

In specific embodiments of the invention, the FIFO memory may comprise a single data item register, a unidirectional FIFO memory directed from the host computer to the slave processor, a bidirectional FIFO memory, or a pair of oppositely directed unidirectional FIFO memories.

The invention may be more fully understood from the following detailed description, taken in the light of the accompanying drawing and the appended claims.

DETAILED DESCRIPTION

Figure 1:
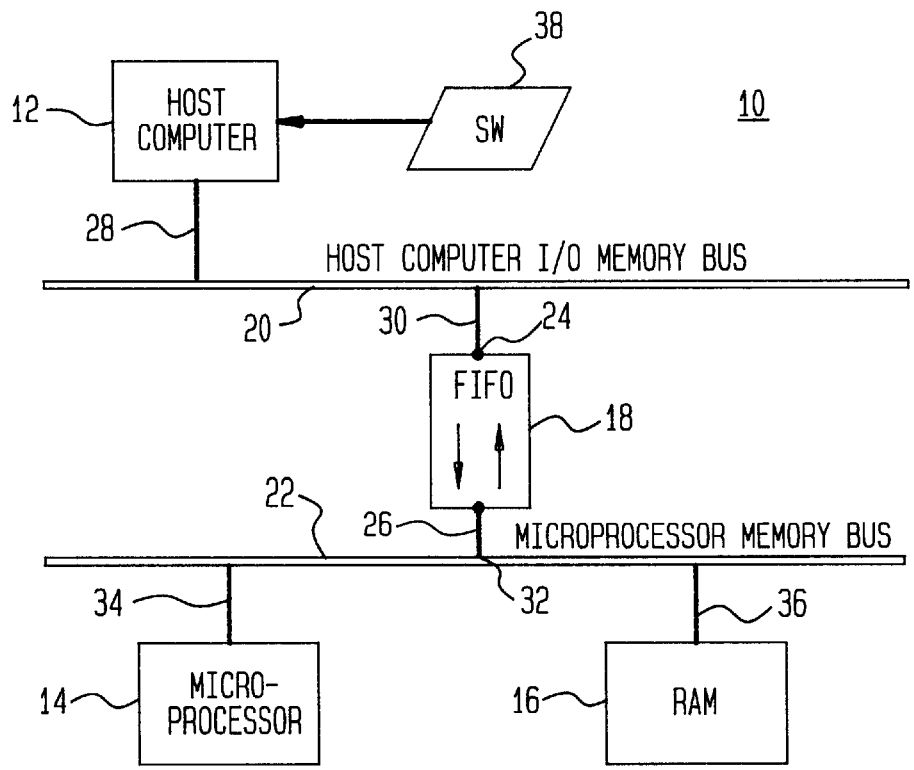
FIG. 1 is a block diagram of a computer system embodying the invention.

In FIG. 1, a computer system 10 which embodies the present invention has, as its principal components, a host computer 12, a programmable microprocessor 14, a random access memory (RAM) 16 for microprocessor 14, and a first in first out (FIFO) memory 18. FIFO memories are well known in the art. Briefly, a FIFO memory comprises a memory array with two different pointers: a write pointer for filling the FIFO memory and a read pointer for emptying the FIFO memory. The write and read operations are initiated by the application of respective write and read input signals.

Host computer 12 in system 10 has an I/O memory bus 20 (sometimes called an interface/memory bus) and microprocessor 14 (the slave processor) is programmable and has a memory bus 22. FIFO memory 18 has both a host port 24 and a microprocessor port 26 and may be a single data item register, a unidirectional FIFO memory directed from the host computer to the slave processor, a bidirectional FIFO memory, or a pair of oppositely directed unidirectional FIFO memories.

Host computer 12 in system 10 is connected to I/O memory bus 20 through a bidirectional connection 28, and host port 24 of FIFO memory 18 is connected to I/O memory bus 20 through a bidirectional connection 30. Microprocessor port 26 of FIFO memory 18 is connected to microprocessor memory bus 22 through a bidirectional connection 32, while microprocessor 14 and its RAM 16 are connected to microprocessor memory bus 22 through respective bidirectional connections 34 and 36. Finally, host computer 12 is provided with appropriate software, shown symbolically by a box 38 labelled SW.

Computer system 10 solves the communication and boot up problems of the prior art simply and inexpensively. FIFO memory 18 serves both host computer 12 and microprocessor 14. FIFO memory 18 is accessed as if it were a random access memory (RAM) by microprocessor 14. This is achieved by mapping microprocessor port 26 of FIFO memory 18 to a range of memory addresses on memory bus 22. The data connections of memory bus 22 to FIFO memory 18 are the same as would be used for a RAM device, but the address connections that would be required for a RAM to operate properly are not available or necessary for the FIFO memory.

Accessing of FIFO memory 18 takes place at the beginning of the boot process, either when power is first applied (a cold boot) or when microprocessor 14 is reset (a warm boot). Host computer 12 provides the boot program instructions and/or the boot program data (ultimately from software source 38) expected by microprocessor 14 by writing the boot program and/or data into host port 24 of FIFO memory 18 in the proper sequence. Although FIFO memory 18 is not a true random access device like a ROM or a RAM, it appears to be so in this instance because host computer 12 is providing the boot program and/or boot data from microprocessor port 26 of FIFO memory 18 in the same sequence in which it might otherwise be retrieved from RAM or ROM by microprocessor 14. The boot process continues normally from that point onward, with the operating instructions of the application program being read into RAM 16 from the source or sources (not shown) specified by the boot program and/or data received from host computer 12 through FIFO memory 18. In the event an on-chip (within microprocessor 14) boot program is used and only the boot data is being retrieved from FIFO memory 18, the boot process may be complete after the boot data has been transferred to RAM 16. The on-chip boot program then transfers control of microprocessor 14, which begins executing the just transferred program from RAM 16.

To prepare for implementation of the invention, the boot program that is to be run on microprocessor 14 is written in a suitable programming language such as C. The boot program is then run through another program called a compiler, normally supplied by the vendor of the microprocessor. The output of the compiler is an executable program file that, when loaded into the microprocessor's memory (i.e., RAM 16), will perform some desired task. For a microprocessor such as the TMS320C40 DSP manufactured by Texas Instruments, Inc., this executable program file is in a form referred to as the Common Object File Format (COFF). Such a file comprises different sections generated by the compiler, each of which must be loaded into RAM 16. The COFF file or its equivalent is made available to host computer 12 by way of software source 38.

Underlying the invention is the realization that every microprocessor has a unique sequence of events that occur when it is reset (by either a warm or a cold boot). Most microprocessors start reading instructions from a specific location in memory and interpret instructions as they are fetched. The booting sequence is, in other words, always the same. In computer system 10, host computer 12 provides the instructions that are executed by microprocessor 14 for loading the basic boot program.

After the basic boot program is loaded, the instructions required to begin executing the just loaded boot program on microprocessor 14 are sent from host computer 12 through FIFO memory 18 to microprocessor 14. Once the boot program is running on microprocessor 14, the various sections of the COFF file for the application program are sent by host computer 12 through FIFO memory 18 to microprocessor 14. Microprocessor 14, which is executing the boot program, then loads the application program to be executed into RAM 16.

By using FIFO memory 18 for booting up microprocessor 14, the invention achieves a number of specific advantages. First of all, the boot program used by microprocessor 14 is easy to change since it is not located in a ROM. Secondly, the components in computer system 10 are reduced by the number of ROM's that would otherwise be required. Finally, FIFO memory 18 remains available for use as a means by which microprocessor 14 can communicate with host computer 12 after the booting up process has been completed.

Figure 2:
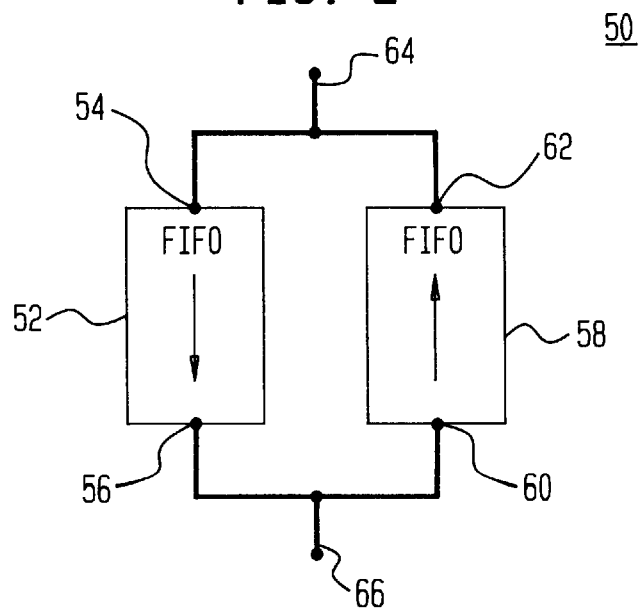
FIG. 2 illustrates a pair of unidirectional FIFO memories used to emulate a bidirectional FIFO memory.

FIG. 2 illustrates an equivalent bidirectional FIFO memory 50, which may be used instead of a specially fabricated bidirectional FIFO memory as FIFO memory 18 in computer system 10 for applications in which a bidirectional FIFO memory is desired. Bidirectional FIFO memory 50 comprises a first unidirectional FIFO memory 52 having an input port 54 and an output port 56 and a second unidirectional FIFO memory 58 having an input port 60 and an output port 62. Input port 54 and output port 62 are connected together to a host port 64, while input port 60 and output port 56 are connected together to a microprocessor port 66. Host port 64 of equivalent bidirectional memory 50 is the full equivalent of FIFO memory host port 24 when a bidirectional FIFO memory is used in computer system 10, while microprocessor port 66 is the full equivalent of FIFO memory microprocessor port 26 when a bidirectional FIFO memory is used in computer system 10.

Unidirectional FIFO memories are, if anything, even more common than bidirectional FIFO memories. Each of FIFO memories 52 and 58 comprises a memory array with two pointers, a write pointer for filling memory locations with data and a read pointer for emptying them. A unidirectional FIFO memory differs from a bidirectional FIFO memory in that, in the former, only one port may serve to receive input and only one port may serve to provide output.

As an alternative, in the event that the only communication direction needed is from host computer 12 to microprocessor 14, only a portion of the circuit configuration illustrated in FIG. 2 need be used. In that event, only FIFO memory 52 is needed, with input port 54 of FIFO memory 52 serving as host port and output port 56 of FIFO memory 52 serving as microprocessor port. In some instances, where buffering of data is not required, a single data item register may be used as a FIFO memory. A single data item register can be described as a FIFO memory with a storage capacity of one data item. Typical FIFO memories can have a storage or buffering capability of from 256 to 4096 data items.

Figure 3:
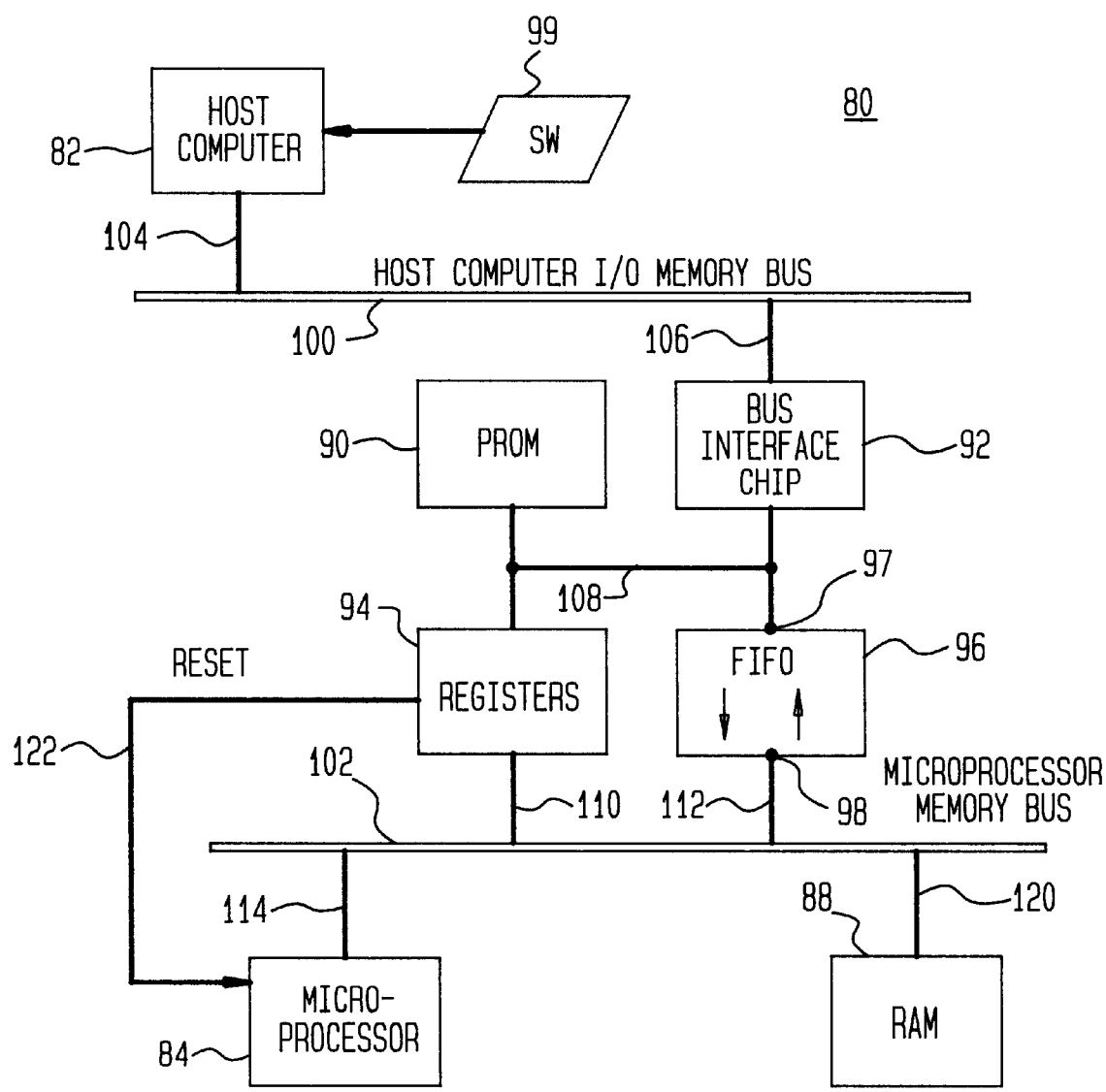
FIG. 3 is a more detailed block diagram of a computer system embodying the invention.

FIG. 3 illustrates a computer system 80 in accordance with the present invention which is a more detailed equivalent of computer system 10. Computer system 80 has, as its principal components, a host computer 82, a programmable microprocessor 84, a RAM 88 for microprocessor 84, a programmable read only memory (PROM) 90, a bus interface chip 92, a set of microprocessor control/status registers 94, and a bidirectional FIFO memory 96 having a host port 97 and a microprocessor port 98. RAM 88 is used to provide a block of memory with high speed read and write access. Host computer 82 is provided with appropriate software, shown symbolically by a box 99 labelled SW.

Host computer 82 may, by way of example, be a Sun Microsystems, Inc., SPARCstation 2 computer, which has an add-on I/O memory bus 100 (sometimes referred to as the SBus). Microprocessor 84 may, by way of example, be a Texas Instruments TMS320C40 Digital Signal Processor, which has at least one memory bus 102.

Host computer 82 is connected to I/O memory bus 100 by a 32 bit wide (32 bits of data can be transferred simultaneously) bidirectional data connection 104. Interface chip 92 is connected to I/O memory bus 100 by another 32 bit wide bidirectional data connection 106 and serves as an interface between bus 100 and PROM 90, registers 94, and FIFO memory 96. A common 8 bit wide bidirectional data connection 108 interconnects interface chip 92, PROM 90, registers 94, and host port 97 of FIFO memory 96. PROM 90 contains configuration information required by I/O memory bus 100 (SBus configuration PROM). Registers 94 control the reset and configuration of microprocessor 84. An 8 bit wide bidirectional data connection 110 connects registers 94 to microprocessor memory bus 102, while an 8 bit wide bidirectional data connection 112 connects microprocessor port 98 of FIFO memory 96 to microprocessor memory bus 102.

A first 32 bit wide bidirectional data connection 114 connects microprocessor 114 to microprocessor memory bus 102 and a second 32 bit wide bidirectional data connection 120 connects RAM 88 to microprocessor memory bus 102. A reset connection 122 couples registers 94 to microprocessor 84 to provide a booting or resetting signal to microprocessor 84.

In computer system 80, microprocessor 84 may, by way of example, be used as a slave processor to perform image processing tasks sent to it by the main processor in host computer 82. FIFO memory 96 is used for communication between host computer 82 and microprocessor 84. When microprocessor 84 is in use, messages are sent both from host computer 82 to microprocessor 84 and from microprocessor 84 to host computer 82 via FIFO 96. Interface chip 92 may, by way of example, be an LSI Logic, Inc. L64853A SBus DMA (Direct Memory Access) Controller, which is programmed by host computer 82 to perform the transfers between FIFO memory 96 and the memory (not separately shown) of host computer 82.

In the example given, microprocessor 84 has an on-chip ROM that allows it to boot up in any of several ways: (1) from an 8, 16, or 32-bit ROM located at a fixed memory address, (2) from an on-chip communication port, or (3) from another fixed memory location. Computer system 80 uses the on-chip ROM of microprocessor 84 and bidirectional FIFO memory 96 to achieve the boot-up task. Host computer 82, using the control status registers, has the capability to drive electrical inputs of microprocessor 84 in order to reset and configure it.

After microprocessor 84 is reset, a small boot loader program in an on-chip ROM (not explicitly shown) of microprocessor 84 ascertains the memory location from which to begin reading the boot-up data. In computer system 80, FIFO memory 96 is mapped to a range of about one million memory addresses. The inputs of microprocessor 84 are programmed by host computer 82 to read 8-bit boot-up data from FIFO memory 96.

The data access requirements of the on-chip boot program in microprocessor 84 are predictable, so the program sent to microprocessor 84 is read from a system disk (not shown) of host computer 82 and re-ordered by a program (from software 94) in host computer 82 and sent to microprocessor 84 via FIFO memory 96. Microprocessor 84 reads the data from FIFO memory 96 just as if were reading it from a ROM device and completes the boot process by loading the application program into RAM 88. Microprocessor 84 then starts executing the program just loaded into RAM 88 from FIFO memory 96.

By using FIFO memory 96 instead of a ROM device or a dual ported RAM during the boot-up process, computer system 80 achieves a number of advantages. Microprocessor 84 does not require a ROM integrated circuit that might otherwise be required. This reduces manufacturing cost, system complexity, and system size. Moreover, system 80 does not require a ROM update in the event the boot program for microprocessor 84 is changed some time during the life of the system. The boot program is on host computer 82. Finally, FIFO memory 96 is usable for communication between host computer 82 and microprocessor 84 after the booting up stage is completed.

It is to be understood that the embodiments of the invention which have been described are illustrative. Numerous other arrangements and modifications may be readily by devised by those skilled in the art without departing from the spirit and scope of the invention.

What is claimed is:

1. A computer system comprising:
a host computer;
a programmable microprocessor controlled by said host computer;
a first in first out memory connected between said host computer and said microprocessor; and
means for providing boot data from said host computer to said microprocessor through said first in first out memory.

2. The computer system of claim 1 in which said first in first out memory is bidirectional.

3. The computer system of claim 1 in which said first in first out memory comprises a pair of oppositely directed unidirectional first in first out memories.

4. The computer system of claim 1 in which said first in first out memory comprises a unidirectional first in first out memory connected to carry data from said host computer to said microprocessor.

5. The computer system of claim 1 in which said first in first out memory is a single data item register connected to carry data from said host computer to said microprocessor.

6. The computer system of claim 1 which comprises at least one random access memory associated operationally with said microprocessor and in which said boot program causes operating instructions for said microprocessor to be read into said random access memory.

7. A computer system comprising:
a host computer;
a programmable microprocessor controlled by said host computer;
a first in first out memory connected between said host computer and said microprocessor; and
means for providing a boot program and boot data from said host computer to said microprocessor through said first in first out memory.

8. The computer system of claim 7 in which said first in first out memory is bidirectional.

9. The computer system of claim 7 in which said first in first out memory comprises a pair of oppositely directed unidirectional first in first out memories.

10. The computer system of claim 7 in which said first in first out memory comprises a unidirectional first in first out memory connected to carry data from said host computer to said microprocessor.

11. The computer system of claim 7 in which said first in first out memory is a single data item register connected to carry data from said host computer to said microprocessor.

12. The computer system of claim 7 which comprises at least one random access memory associated operationally with said microprocessor and in which said boot program causes operating instructions for said microprocessor to be read into said random access memory.

13. A computer system comprising:
a host computer having an input/output expansion bus;
a programmable microprocessor controlled by said host computer and having at least one memory bus;
a first in first out memory connected between said input/output expansion bus of said host computer and said memory bus of said microprocessor; and
means for providing boot data from said host computer to said microprocessor through said first in first out memory.

14. The computer system of claim 13 in which said first in first out memory is bidirectional.

15. The computer system of claim 13 in which said first in first out memory comprises a pair of oppositely directed unidirectional first in first out memories.

16. The computer system of claim 13 in which said first in first out memory comprises a unidirectional first in first out memory connected to carry data from said input/output expansion bus of said host computer to said memory bus of said microprocessor.

17. The computer system of claim 13 in which said first in first out memory is a single data item register connected to carry data from said input/output expansion bus of said host computer to said memory bus of said microprocessor.

18. The computer system of claim 13 which comprises at least one random access memory connected to said memory bus of said microprocessor and in which said boot program causes operating instructions for said microprocessor to be read into said random access memory.

19. A computer system comprising:
a host computer having an input/output expansion bus;
a programmable microprocessor controlled by said host computer and having at least one memory bus;
a first in first out memory connected between said input/output expansion bus of said host computer and said memory bus of said microprocessor; and
means for providing a boot program and boot data from said host computer to said microprocessor through said first in first out memory.

20. The computer system of claim 19 in which said first in first out memory is bidirectional.

21. The computer system of claim 19 in which said first in first out memory comprises a pair of oppositely directed unidirectional first in first out memories.

22. The computer system of claim 19 in which said first in first out memory comprises a unidirectional first in first out memory connected to carry data from said input/output expansion bus of said host computer to said memory bus of said microprocessor.

23. The computer system of claim 19 in which said first in first out memory is a single data item register connected to carry data from said input/output expansion bus of said host computer to said memory bus of said microprocessor.

24. The computer system of claim 19 which comprises at least one random access memory connected to said memory bus of said microprocessor and in which said boot program causes operating instructions for said microprocessor to be read into said random access memory.

* * * * *